US009756027B2

(12) United States Patent
Li et al.

(10) Patent No.: US 9,756,027 B2
(45) Date of Patent: Sep. 5, 2017

(54) PROTECTED INFORMATION SHARING

(71) Applicant: International Business Machines Corporation, Armonk, NY (US)

(72) Inventors: Ping Li, Huicheng District (CN); Jia Wei, Xi'an (CN); Yang Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/850,190

(22) Filed: Sep. 10, 2015

(65) Prior Publication Data
US 2016/0149875 A1 May 26, 2016

(30) Foreign Application Priority Data

Nov. 24, 2014 (CN) .......................... 2014 1 0682931

(51) Int. Cl.
H04L 29/06 (2006.01)
G06F 21/62 (2013.01)

(52) U.S. Cl.
CPC ...... *H04L 63/0478* (2013.01); *G06F 21/6209* (2013.01); *G06F 21/6245* (2013.01); *H04L 63/0435* (2013.01); *H04L 63/0471* (2013.01); *H04L 63/08* (2013.01); *G06F 2221/2107* (2013.01); *G06F 2221/2117* (2013.01)

(58) Field of Classification Search
CPC ............. H04L 63/0428; H04L 63/0435; H04L 63/0478; H04L 63/08; H04L 63/0471; G06F 21/6254

USPC ................................................. 713/183, 168
See application file for complete search history.

(56) References Cited

U.S. PATENT DOCUMENTS

| 5,751,813 | A | * | 5/1998 | Dorenbos | H04L 63/0442 |
| | | | | | 380/270 |
| 8,065,173 | B2 | | 11/2011 | Abu-Hakima et al. | |
| 8,321,918 | B2 | | 11/2012 | Cho et al. | |
| 8,549,657 | B2 | | 10/2013 | Karlson et al. | |
| 8,752,196 | B2 | | 6/2014 | King | |
| 8,769,276 | B2 | | 7/2014 | Noh et al. | |
| 2001/0020228 | A1 | * | 9/2001 | Cantu | G06F 21/335 |
| | | | | | 705/50 |
| 2006/0168204 | A1 | * | 7/2006 | Appelman | H04L 12/5855 |
| | | | | | 709/224 |

(Continued)

OTHER PUBLICATIONS

Anonymous, "Sharing confidential data between application users in a combined (symmetric/asymmetric) encryption scheme," An IP.com Prior Art Database Technical Disclosure, IP.com No. 000228586, IP.com Electronic Publication: Jun. 20, 2013, 6 pages.

(Continued)

*Primary Examiner* — Syed Zaidi
(74) *Attorney, Agent, or Firm* — Nolan M. Lawrence

(57) ABSTRACT

A request for sharing information of a first user to a second user is received. Responsive to the request, information of the first user is obtained. The information is encrypted using a first server key to generate first encrypted information, the first server key being unavailable to the second user. The first encrypted information is encrypted using a second user key specific to the second user to generate second encrypted information for sharing with the second user.

3 Claims, 6 Drawing Sheets

(56) References Cited

U.S. PATENT DOCUMENTS

2012/0210126 A1* 8/2012 Johnson .................. G06F 17/30
713/165

OTHER PUBLICATIONS

IBM, "A Method for Privacy-protected User-controlled Information Collection," An IP.com Prior Art Database Technical Disclosure, IP.com No. 000011552, Original Publication Date: Mar. 4, 2003, IP.com Electronic Publication: Mar. 4, 2003, 5 pages.
Wikipedia, "vCard," From Wikipedia, the free encyclopedia, 18 pages, last modified on Jun. 9, 2015, https://en.wikipedia.org/wiki/VCard.
CN Application 201410682931.4, Entitled "Method and Apparatus for Information Sharing," Filed Nov. 24, 2014, 29 pages.

\* cited by examiner

PROTECTED INFORMATION SHARING

BACKGROUND

Embodiments of the present disclosure relate to the field of computers, and more specifically relate to information sharing.

In many cases users need to share private information with others, including name, address, telephone, family information, work information, ID number, and the like, for example. A party obtaining such user information may leak the user's private information, intentionally or unintentionally, to a third party, which might bring undesired trouble or even security problems to the user. For example, the user might receive undesired calls such as crank calls and/or prospecting calls.

SUMMARY

In general, embodiments of the present disclosure provide a technical solution for controlling information sharing.

In one aspect, embodiments of the present disclosure provide a method of controlling information sharing. The method comprises: responsive to a request for sharing information of a first user to a second user, obtaining the information of the first user; encrypting the information using a first server key to generate first encrypted information, the first server key being unavailable to the second user; and encrypting the first encrypted information using a second user key specific to the second user to generate second encrypted information for sharing with the second user.

In another aspect, embodiments of the present disclosure provide an apparatus for controlling information sharing. The apparatus comprises: an information obtaining unit configured to, responsive to a request for sharing information of a first user to a second user, obtain the information of the first user; a first encrypting unit configured to encrypt the information using a first server key to generate first encrypted information, the first server key being unavailable to the second user; and a second encrypting unit configured to encrypt the first encrypted information using a second user key specific to the second user to generate second encrypted information for sharing with the second user.

In yet another aspect, embodiments of the present disclosure include a computer program product for controlling information sharing. The computer program product includes a non-transitory computer readable storage medium having program instructions embodied therewith. The program instructions are executable by a computer to cause the computer to perform a method. The method comprises: responsive to a request for sharing information of a first user to a second user, obtaining the information of the first user; encrypting the information using a first server key to generate first encrypted information, the first server key being unavailable to the second user; and encrypting the first encrypted information using a second user key specific to the second user to generate second encrypted information for sharing with the second user.

According to embodiments of the present disclosure, the server may control information sharing through multiple instances of encryption, such that the target user can use the information of the source user, but cannot obtain or abuse the information per se. Other features and advantages of the present disclosure will become easily comprehensible through the description below.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

In respective figures, same or like reference numerals are used to represent the same or like components.

Figure 1:
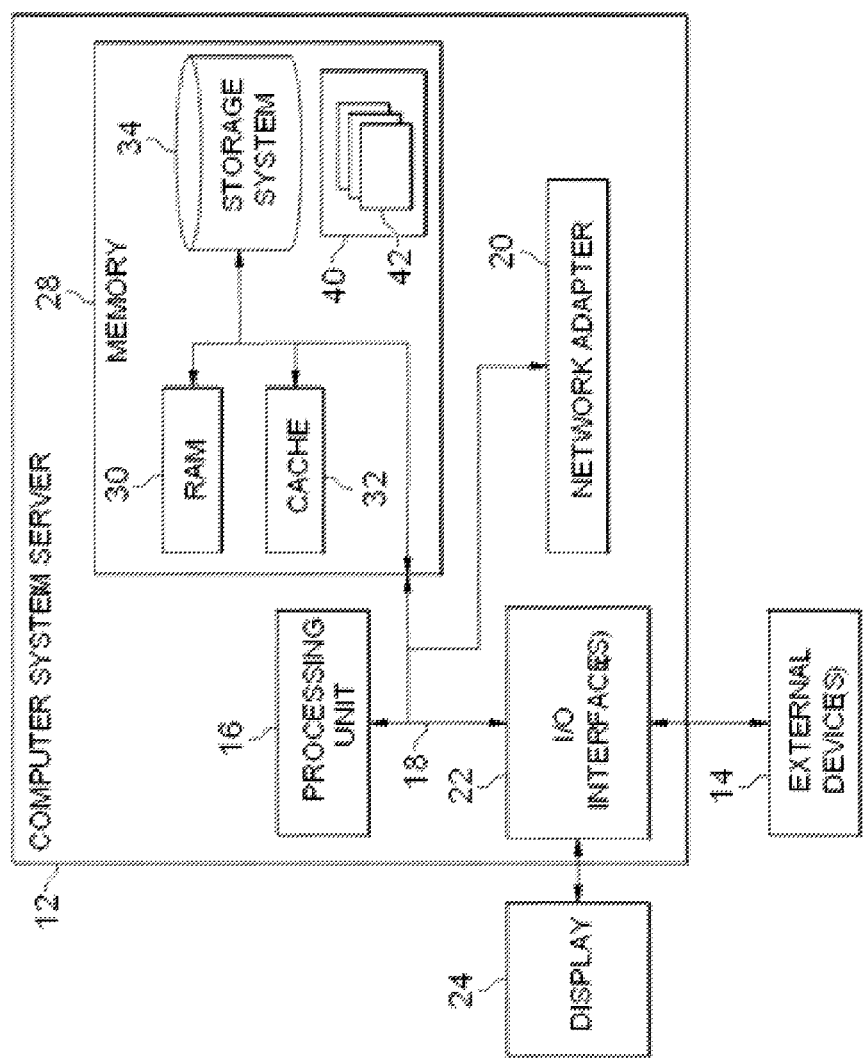
FIG. 1 shows an exemplary computer system/server which is applicable to implement embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the field of computers, more particular aspects relate to information sharing. While the present disclosure is not necessarily limited to such applications, various aspects of the disclosure may be appreciated through a discussion of various examples using this context.

To address problems with sharing private information, conventional solutions allow encrypting private information of a user when sharing so as to prevent an irrelevant third party from obtaining the private information. However, a party acting as the information recipient can obtain the plain text of the private information through a cracking technology. Therefore, there is still a risk of information leakage. Moreover, after the information is shared, the user cannot control subsequent propagation and forwarding of the information.

Another problem associated with information sharing lies in information update. When a user shares his/her information with others, the shared information might be updated or modified. For example, the user's telephone number might be changed. At present, the user has to notify information recipients one by one, which is a time-consuming and troublesome process and increases the user's burden.

Referring now to FIG. 1, where an exemplary computer system/server 12 which is applicable to implement embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present disclosure will be described in detail. Unless otherwise stated, the term "based on" used hereinafter and in the claims expresses "at least partially based on." The term "comprise" or "include" or a similar expression indicates an opened inclusion, i.e., "including, but not limited to." The term "plural" or a similar expression indicates "two or more." The term "one embodiment" indicates "at least one embodiment." The term "another embodiment" indicates "at least one another embodiment." Definitions of other terms will be provided in the description infra.

Figure 2:
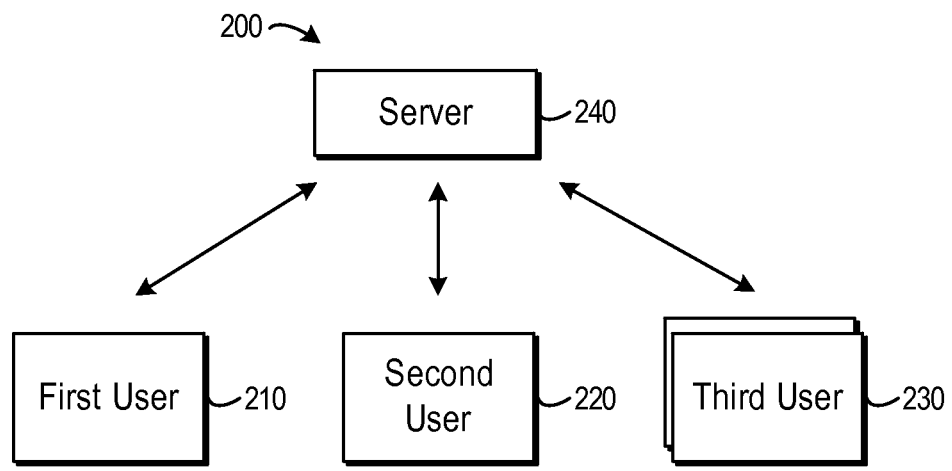
FIG. 2 shows a schematic block diagram of an information sharing environment in which embodiments of the present disclosure may be implemented.

FIG. 2 shows a schematic block diagram of an environment 200 in which embodiments of the present disclosure may be implemented. The environment 200 comprises a first user 210, a second user 220, and one or more third users 230. Each of the users 210-230 may use their own user devices. The user device may be any appropriate electronic devices, examples of which include, but are not limited to, one or more of the following: a desk computer, a portable computer, a tablet computer, a personal digital assistant (PDA), a cellular phone, a smart phone, and the like. The user device may store user information and data.

In response to a user request, different users may share designated information therebetween. To this end, different user devices may communicate with one another. The communication medium between user devices may include, but are not limited to, network connections such as the Internet, wide area network, local area network, metropolitan area network, and the like; telecommunication networks such as 2G, 3G, 4G telecommunication networks; and near-field communications such as infrared, Bluetooth, and the like.

The environment 200 further comprises a server 240. For example, in one embodiment, the server 240 may be a cloud server. The server 240 may be implemented using any appropriate computer/server, for example, the computer/server 12 described above with reference to FIG. 1. Besides other functions, the server 240 may communicate with user devices of respective users so as to control information sharing between different users. In other words, according to embodiments of the present disclosure, information sharing between different users is performed under the control of the server. Hereinafter, FIG. 3 will be referenced to describe the operations and functions of the server 240.

Figure 3:
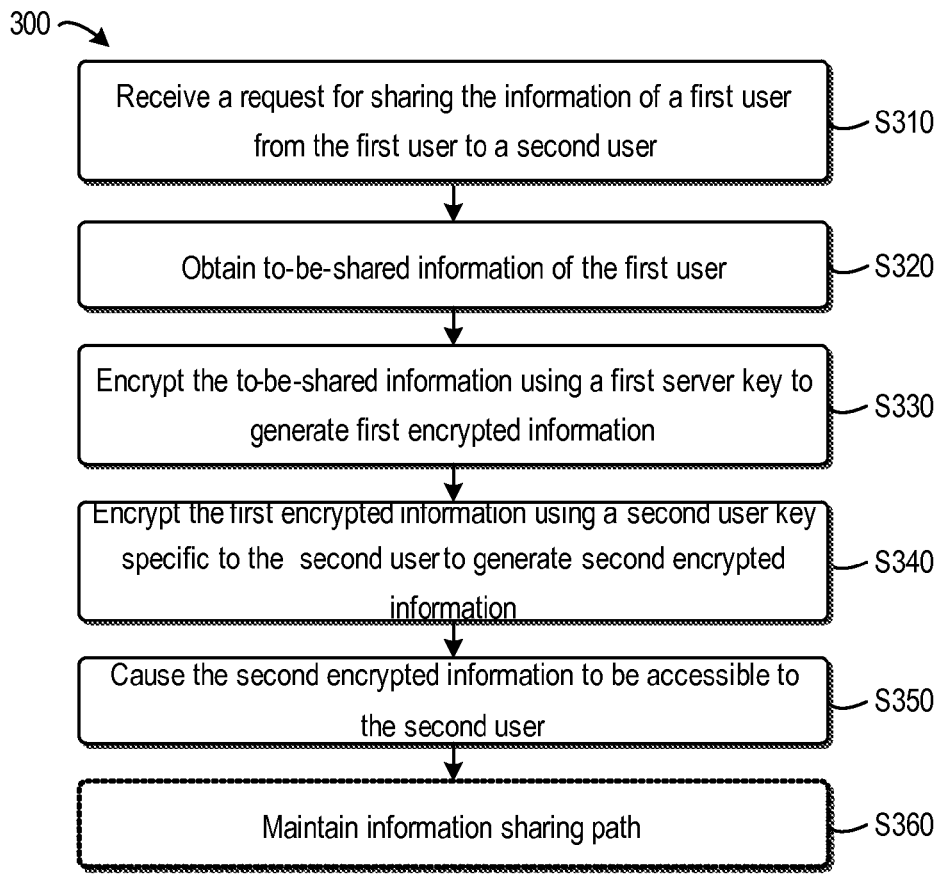
FIG. 3 shows a schematic flow diagram of a method for controlling information sharing according to embodiments of the present disclosure.

FIG. 3 shows a schematic flow diagram of a method 300 of controlling information sharing consistent with embodiments of the present disclosure. As mentioned above, in one embodiment, the method 300 may be performed by a server 240 for controlling information sharing.

The method 300 starts from step S310, in which a request for sharing information of the first user 210 with the second user 220 is received. In one embodiment, information sharing may be initiated by the first user 210. For example, the first user 210 may operate a given element in a user interface (UI) on its user device so as to share the designated information to a user device of the second user 220. In this case, the first user 210 may send an information sharing request to the server 240, the information sharing request may include an identifier of a first user, an identification of a second user 220, and an indication of the to-be-shared information. Alternatively or additionally, the information sharing request may be sent by the equipment of the second user 220 to the server.

According to embodiments of the present disclosure, the to-be-shared information may include any information regarding the first user. For example, the to-be-shared information may include the first user's personal information (such as name, age, and the like), demographical information (such as education, work, and the like), communication information (such as telephone number, instant messaging account, and the like), and social information (such as account, friends and the like in a social network). These examples are only illustrative, not intended to limit the scope of the present disclosure in any manner.

According to embodiments of the present disclosure, the above information may be organized in any appropriate manner. For example, in one embodiment, information of the first user may be organized in a token card associated with the first user. The term "token card" used here is a structure for organizing and storing information. As an example, FIG. 4 shows a schematic diagram of a token card 400.

Figure 4:
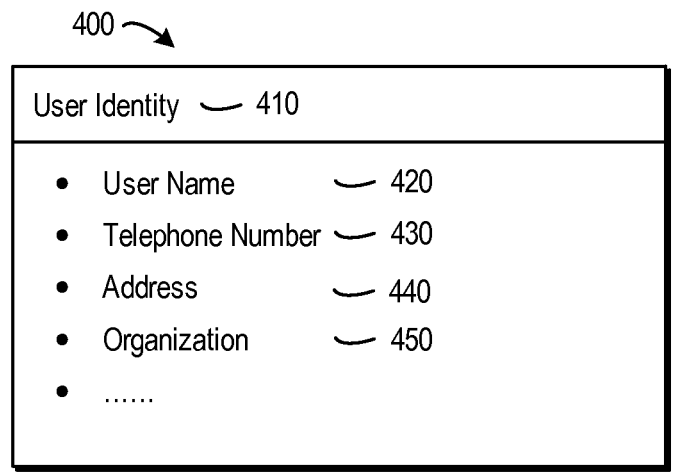
FIG. 4 shows a schematic diagram of a token card for organizing user information according to embodiments of the present disclosure.

The token card 400 shown in FIG. 4 includes a unique identity 410 of the first user. The identity 410 may be any information capable of uniquely identifying a user in the system 200 and may be used to retrieve the token card of a corresponding user. Additionally, in the example as shown, the token card 400 comprises name 420, telephone number 430, correspondence address 440, organization information 450 and the like of the first user. It should be appreciated that the example of FIG. 4 is provided for the purpose of illustration, and is not intended to limit the scope of the present disclosure in any manner. In other embodiments, the token card may include less, more, or alternative information items.

According to embodiments of the present disclosure, the token card of each user may be stored in a server. Alternatively or additionally, a copy of the token card may be stored locally at the user device. Particularly, in one embodiment, the token card may be encrypted. For example, the server 240 may encrypt the token card of the user using a key specific to the user. For the sake of discussion, this key is referred to as "user key." With the first user as an example, the server 240 may use a first user key specific to the first user to encrypt the token card of the first user.

In one embodiment, a symmetrical encryption process may be applied to implement the encryption. This helps the server to easily decrypt and manipulate the token card. Of course, it is also possible to use an asymmetrical encryption process to encrypt the token card. In this way, only the first user may use a private key to decrypt his/her token card. Therefore, for any given user, even if another user obtains his/her token card, the information in the token card cannot be accessed.

In another embodiment, the token card may not be encrypted. In this case, the token card may not be sent to users other than the information owner. For example, a plain token may be only stored in the server and/or user device of the owner. The server may forbid transmission of a plain token between user devices.

Additionally, it is possible that the request received in step S310 only concerns a part of information in the token card. For example, in the example shown in FIG. 4, the first user may indicate to only share the information item 430 in the token card 400 (telephone number) to the second user. Of course, all information in the token card may be shared to the second user.

It should be appreciated that although the token card will be used as an example in the description below, it is only exemplary, not intended to limit the scope of the present disclosure in any manner. In other embodiments, information may be organized in any appropriate form, for example, stored in a file, a database table, and the like.

Still with reference to FIG. 3, the method 300 proceeds to step S320, where responsive to the request received in step S310, relevant information of the first user to be shared to the second user is obtained. As indicated above, in one embodiment, the information to be shared is encrypted using a key specific to the first user. In such embodiment, in step S320, the server 240 may obtain a first user key specific to the first user based on an identity of the first user. Then, the server 240 decrypts the token card of the first user using the first user key to obtain the to-be-shared information.

Alternatively, as indicated above, in one embodiment, the to-be-shared information of the first user may be stored at the server 240 in a plain text form. In this embodiment, in step S320, the server 240 may directly retrieve the to-be-shared information of the first user from storage of the server.

The method 300 proceeds to step S330, where the key generated by the server 240 is used to encrypt the to-be-shared information. For the sake of discussion, the key used by the server 240 here is referred to as "a first server key," and the encrypted information is referred to as "first encrypted information."

According to embodiments of the present disclosure, the first server key is at least unavailable to the second user. In other words, the server 240 does not allow the second user 220 to access or obtain the first server key in any manner. As such, it is ensured that the second user cannot decrypt the first encrypted information. Alternatively, in one embodiment, in order to further enhance the security, the first server key is unavailable to the first user as well. In other words, only the server knows the first server key. For example, the first server key can be stored only at the server and is unavailable to any user device.

In one embodiment, the server 240 applies a symmetrical encryption process to the to-be-shared information through using the first server key. Any symmetrical encryption technology, either currently known or to be developed in the future, may be used in conjunction with embodiments of the present disclosure, and the scope of the present disclosure is not limited in this aspect. In this way, the first server key may be used to perform both information encryption and decryption. Therefore, when the second user requests the information later, the server may directly use the first server key to decode the first encrypted information so as to retrieve the information. In this way, potential security issues due to storing the user's private key on the server may be avoided, and meanwhile, frequent interaction between user devices may also be avoided.

Next, the method 300 proceeds to step S340, in which the first encrypted information generated in step S330 is encrypted using a key specific to the second user (referred to as "second user key"). For the sake of discussion, the encrypted information generated in step S340 is referred to as "second encrypted information."

In one embodiment, the second user is also a registered user of the system. In this case, the server 240 stores a token card associated with the second user. Moreover, as indicated above, the token card may be encrypted. In such an embodiment, for example, the second user key used in step S340 may be a key associated with encryption of the second user's token card. Of course, the server may also use any other key specific to the second user as the second user key so as to encrypt the first encrypted information.

Figure 5:
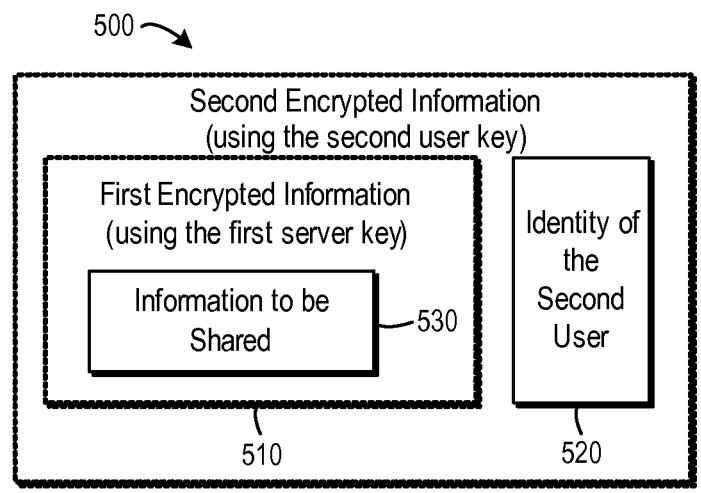
FIG. 5 shows a schematic diagram of to-be-shared encrypted information generated by a server according to embodiments of the present disclosure.

In particular, in one embodiment, in step S340, the first server key may be used to encrypt both the first encrypted information and the identity of the second user, thereby generating second encrypted information. FIG. 5 shows a schematic diagram of second encrypted information. In this example, the second encrypted information 500 may include first encrypted information 510 and the second user's identity 520, both of which are encrypted using a second user key specific to the second user. The first encrypted information 510 includes to-be-shared original information 530. The first encrypted information 510 may be generated by encrypting the original information using the first server key of the server 240.

By including the second user's identity in the second encrypted information, a more reliable identity authentication may be performed to the second user when the second user requests to use the information of the first user, thereby avoiding potential security issues caused by identity forgery. The embodiment in this aspect will be described in detail hereinafter. Of course, the second encrypted information does not necessarily include the identity of the second user. In an alternative embodiment, in step S340, it is allowed to only use the second user key to encrypt the first encryption information. In this case, the second user identity 520 in the second encrypted information 500 may be omitted.

It should be appreciated through the above description that the second encrypted information is formed through twice encryption of the to-be-shared information. The first encryption is performed using a first server key unavailable to the second user, and the second encryption is performed using a second user key specific to the second user. As an example, in an embodiment where the user information is organized into a token card, the token card generated in step S340 has the to-be-shared information of the first user. However, this token card is not an original token card of the first user, but a new token card having two-level protection.

The method 300 proceeds to step S350, where the second encrypted information is accessible to the second user. In one embodiment, the second encrypted information per se is stored at the server 240. What is provided to the second user 220 is a reference directed to the second encrypted information. For example, the server 240 may send, to the second user 220, a uniform resource locator destined to the second encrypted information. For another example, the unique identifier associated with the second encrypted information (for example, the generated encrypted token card) is accessible to the second user 220. The second user may access and use the information of the first user through operating the URL. Alternatively or additionally, it is also feasible to send the second encrypted information to the second user 220.

Therefore, from the perspective of the second user, he/she obtains the information of the first user. The second user may use the information, for example, to communicate with the first user. However, the second user cannot view the specific content of the information. In other words, the plain text of the shared information of the first user is invisible to the second user.

In one embodiment, the method 300 may proceed to an alternative step S360, in which relevant information of the second user is recorded. Likewise, when the second user forwards the information of the first user to another user, the server 240 may record the information of the other target user. In this way, the server 240 may build and maintain an information sharing path.

In one embodiment, the server 240 may display the sharing path to the first user in response to a request from the first user. The first user may select one or more users on the sharing path, and instruct the server 240 to block or lift a ban to the selected user. Then, when a certain user on the sharing path requests to use the information of the user (for example, requesting to communicate with the first user), the server will confirm whether the user has been blocked by the first user. If so, the execution of subsequent actions will be blocked. On the contrary, the first user may also lift a ban to the previously blocked user. In this way, the user can easily and efficiently control the information sharing.

The method 300 can effectively control sharing, forwarding, and using user information. Hereinafter, a plurality of specific application scenarios will be discussed. When the second user intends to use the information of the first user, the second user may send a use request to the server 240, the request at least including a reference (for example, a URL) to the second encryption information. In addition, the request also includes information capable of identifying the second user 220 and/or the second user device, for example, the identity of the second user.

Based on the identification of the requested information, the server 240 may retrieve the second encrypted information from its memory. Then, the server 240 may decrypt the second decryption information using the second user key specific to the second user. The second user key specific to the second user may be stored at the server 240 or sent by the second user 220 to the server 240. If the decryption succeeds, the server 240 may obtain the first encrypted information.

Next, the server 240 may decrypt the first encrypted information using the first server key, thereby obtaining the requested information of the first user. As mentioned above, the first encrypted information is generated using a symmetrical encryption technology, and the first server key is saved by the server. Therefore, the server may easily decrypt the first encrypted information, without a need of providing additional information by the user or communication between user devices. In this way, the server may retrieve the information of the first user and make it available to the second user.

In one embodiment, the server 240 may directly decrypt the first encrypted information using the first server key. Alternatively, in one embodiment, the server 240 may authenticate the second user before decrypting the first encrypted information using the first server key, thereby further enhancing the security level.

For example, as indicated above, in one embodiment, the second encrypted information includes the identity of the second user. Moreover, by decrypting the second encrypted information using the second user key, the server can obtain the identity. Therefore, the server 240 may compare the identity with that identity included in the request for the information. If the two identities match, it is believed that the second user has a legitimate identity. In this way, unauthorized access or use of the first user's information by a malicious party pretending to be the second user may be avoided.

Alternatively or additionally, as mentioned above, the first user may block a given user on the information sharing path. In such an embodiment, the server 240 may confirm whether the second user is blocked by the first user. If the second user is blocked, then the authentication process fails. Otherwise, if the second user is not blocked, it is believed that the first user currently allows the second user to use its information.

The above authentication process is only exemplary, not intended to limit the scope of the present disclosure in any manner. Any other authentication manner is feasible. Moreover, the authentication does not necessarily occur after decrypting the second encrypted information using the second user key. Alternatively, authentication may be performed in response to a use request for the information or executed at any other appropriate timing.

In particular, according to embodiments of the present disclosure, the second user only has a right of using the information of the first user, but cannot view or retrieve the plain text of the information. As an example, as indicated above, the information shared by the first user to the second user may include the communication account of the first user (for example, the telephone number, the instant messaging account, and the like). In such an embodiment, the second user may request to initiate a communication with the first user using the communication account of the first user. For example, the second user may request to initiate a phone call, a SMS communication and the like with the first user.

Besides, in an embodiment, the server 240 obtains contact information of the first user through the above process. Specifically, in response to a communication request from the second user 220, the server 240 decrypts the second encrypted information using the second user key, thereby obtaining the first encrypted information. Alternatively, the server 240 authenticates the second user. If the authentication succeeds, the server 240 then decrypts the first encrypted information using the first server key, thereby obtaining the communication account of the first user in the original information.

Next, the server may cause the communication of the second user to the first user to be initiated. For example, the server may coordinate with a service provider of the requested communication using the communication account of the first user and the communication account of the second user, so as to initiate a communication between the first user 210 and the second user 220. During this process, the server 240 will not send the communication account of the first user to the second user 220, which avoids potential abuse or unauthorized forwarding of the communication account by the second user. From the perspective of the second user, it may communicate normally with the first user, just like he/she actually owned the communication account of the first user.

Additionally, it would be appreciated that the method 300 may not only be used to control initial sharing of the information, but may also control the subsequent forwarding and sharing of the information. Specifically, in one embodiment, the first user may indicate the server whether he/she allows the second user to forward the shared information to other users. In the case of allowing, the second user may share the obtained information of the first user with another user. For the purpose of discussion, assume that the second user wishes to allow sharing the information of the first user with the third user 230. In this case, the server 240 may perform the method 300 again to control the forwarding process.

Specifically, responsive to a request received from the second user 220 in step S310 for sharing the information of the first user 210, the server 240 obtains the to-be-shared information in step S320. Note that the information obtained here is not the original plain text information of the first user, but instead the information which has been encrypted using the first server key, namely, the first encrypted information.

In step S330, the server 240 encrypts the first encrypted information using a new server key. For the sake of discussion, the server key is referred to as "second server key." According to embodiments of the present disclosure, any appropriate method may be used to generate the second server key, as long as the second server key cannot be obtained by the third party as a sharing object.

Similar to the abovementioned, in step S330, the server performs symmetrical encryption to the first encrypted information using the second server key, so as to conveniently perform decryption later. For the sake of discussion, the information resulting from encrypting the first encrypted information using the second server key is referred to as "third encrypted information." Optionally, as mentioned above, in one embodiment, the first encrypted information and the identity of the third user may be encrypted together to form the third encrypted information.

Next, in step S340, the server 240 encrypts the third encrypted information using a third user key specific to the third user. For the sake of discussion, the generated information is referred to as "fourth encrypted information." The fourth encrypted information is an encrypted version of the first user's information to be shared to the third user.

It would be appreciated that the fourth encrypted information is obtained after thrice encrypting the original information of the first user, i.e., using the first server key, the second server key, and the third server key. Therefore, with the increase of the sharing times, the encryption times or layers of the to-be-shared information also increase. This helps to enhance the security during the forwarding process.

Optionally, the server 240 may record the information of the third user in step S360 so as to maintain an update chain. In this way, the first user may maintain a continuous control on the sharing path. For example, the first user may conveniently block any user from using or obtaining the first user's information.

It should be appreciated through the above description that the security of sharing user information will be significantly improved. Additionally, according to embodiments of the present disclosure, the first user may conveniently update its own information. After the information is updated, the first user needn't notify other users one by one like in the traditional solution. Instead, when other users request to use the first user's information, the server 240 is in charge of decryption and information retrieval. In this way, the server may directly use the updated information to originate a communication or other operation. Therefore, user burden associated with information update can be significantly alleviated.

Figure 6:
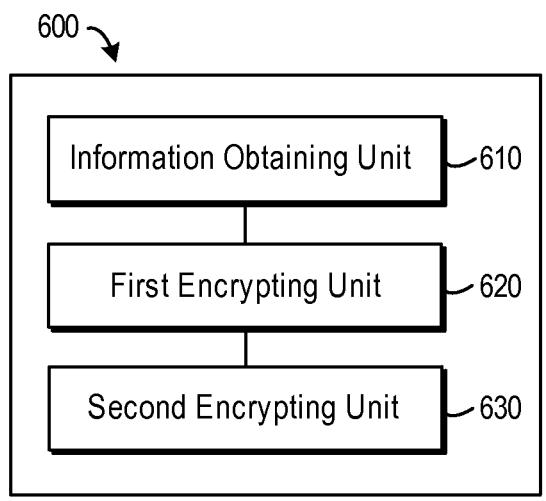
FIG. 6 shows a schematic block diagram of an apparatus for controlling information sharing according to embodiments of the present disclosure.

FIG. 6 shows a schematic block diagram of an apparatus 600 for controlling information sharing according to embodiments of the present disclosure. As shown in the figure, the apparatus 600 comprises: an information obtaining unit 610 configured to, responsive to a request for sharing information of a first user to a second user, obtain the information of the first user; a first encrypting unit 620 configured to encrypt the information using a first server key to generate first encrypted information, the first server key being unavailable to the second user; and a second encrypting unit 630 configured to encrypt the first encrypted information using a second user key specific to the second user to generate second encrypted information for sharing with the second user.

In one embodiment, the information obtaining unit 610 may comprise: a first user key obtaining unit configured to obtain a first user key specific to the first user; and a first decrypting unit configured to decrypt the information, which has been encrypted, using the first user key to obtain the information.

In one embodiment, the first encrypting unit 620 may comprise: a symmetrical encrypting unit configured to apply symmetrical encryption to the information using the first server key.

In one embodiment, the second encrypting unit 630 may comprise: an identity encrypting unit configured to encrypt the first encrypted information and an identity of the second user using the second user key to generate the second encrypted information.

In one embodiment, a reference directed to the second encrypted information is provided to the second user.

In one embodiment, the to-be-shared information may include a communication account of the first user. The apparatus 600 may further include a second decrypting unit configured to, responsive to a request from the second user for initiating communication with the first user using the communication account, decrypt the second encrypted information using the second user key to obtain the first encrypted information; and a third decrypting unit configured to decrypt the first encrypted information using the first server key to obtain the communication account in the information; and a communication initiating unit configured to cause the communication to be initiated without providing the communication account to the second user.

In one embodiment, the apparatus 600 may comprise an authenticating unit configured to authenticate the second user. The authenticating unit may comprise at least one of the following: an identity authenticating unit configured to authenticate an identity of the second user, and a block confirming unit configured to confirm whether the first user allows the second user to initiate the communication. The third decrypting unit may be configured to decrypt the first encrypted information using the first server key responsive to the second user passing authentication of the authenticating unit.

In one embodiment, the apparatus 600 may further comprise: a third encrypting unit configured to, responsive to a request from the second user for sharing the information to a third user, encrypt the first encrypted information using a second server key to generate third encrypted information, the second server key being unavailable to the third user; and a fourth encrypting unit configured to encrypt the third encrypted information using a third user key specific to the third user to generate fourth encrypted information to be provided to the third user.

In one embodiment, the apparatus 600 may further comprise: a sharing path maintaining unit configured to maintain a sharing path of the information by recording information of the second user, the sharing path including one or more users to whom the information is shared.

In one embodiment, the apparatus 600 may also comprise: a sharing path presenting unit configured to present the sharing path to the first user; a blocking request receiving unit configured to receive a request from the first user for blocking a given user in the sharing path; and a user blocking unit configured to, responsive to the request, block access of the given user to the information.

It should be noted that for the sake of clarity, FIG. 6 does not show optional units or sub-units included in the apparatus 600. Features and operations as described above are suitable for apparatus 600, and are therefore not detailed here. Moreover, partitioning of units or subunits in apparatus 600 is exemplary, rather than limitative, intended to describe its main functions or operations logically. A function of one unit may be implemented by a plurality of other units; on the contrary, a plurality of units may be implemented by one unit. The scope of the present disclosure is not limited in this aspect.

Moreover, the units included in the apparatus 600 may be implemented by various manners, including software, hardware, firmware or a combination thereof. For example, in some embodiments, the apparatus may be implemented by software and/or firmware. Alternatively or additionally, the apparatus 600 may be implemented partially or completely based on hardware. for example, one or more units in the apparatus 600 may be implemented as an integrated circuit (IC) chip, an application-specific integrated circuit (ASIC), a system on chip (SOC), a field programmable gate array (FPGA), and the like. The scope of the present intention is not limited to this aspect.

In one embodiment, an apparatus for controlling information sharing comprises a processor in communication with a memory. The processor is configured, upon obtaining instructions from the memory, to perform a method. The method may include: obtaining, responsive to a request for sharing information of a first user to a second user, the information of the first user; encrypting the information using a first server key to generate first encrypted information, the first server key being unavailable to the second user; and encrypting the first encrypted information using a second user key specific to the second user to generate second encrypted information to be shared with the second user.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of controlling information sharing, comprising:
   obtaining, responsive to a request for sharing information of a first user to a second user, the information of the first user, wherein the information includes a communication account of the first user;
   encrypting the information using a first server key to generate first encrypted information, the first server key being unavailable to the second user;
   encrypting the first encrypted information using a second user key specific to the second user to generate second encrypted information to be shared with the second user;
   responsive to a request from the second user for initiating communication with the first user using the communication account, decrypting the second encrypted information using the second user key to obtain the first encrypted information;
   decrypting the first encrypted information using the first server key to obtain the communication account in the information; and
   causing the communication to be initiated without providing the communication account to the second user.

2. The method according to claim 1, wherein decrypting the first encrypted information using the first server key comprises:
   authenticating the second user, the authenticating comprising:
   authenticating an identity of the second user, and confirming whether the first user allows the second user to initiate the communication; and responsive to the authenticating the second user, decrypting the first encrypted information using the first server key.

3. The method according to claim 1, further comprising:

responsive to a request from the second user for sharing the information to a third user, encrypting the first encrypted information using a second server key to generate third encrypted information, the second server key being unavailable to the third user; and encrypting the third encrypted information using a third user key specific to the third user to generate fourth encrypted information to be provided to the third user.

* * * * *